(12) United States Patent
Kim (10) Patent No.: US 11,480,304 B1
(45) Date of Patent: Oct. 25, 2022

(54) SURFACE LIGHT EMITTING ILLUMINATION DEVICE USING SEPARATE LED STRIPS

(71) Applicant: FEELIS CO., LTD., Gwangju-si (KR)

(72) Inventor: Young-soo Kim, Gwangju-si (KR)

(73) Assignee: FEELIS CO., LTD., Gwangju-si (KR)

( * ) Notice: Subject to any disclaimer, the term of this patent is extended or adjusted under 35 U.S.C. 154(b) by 0 days.

(21) Appl. No.: 17/711,042

(22) Filed: Apr. 1, 2022

(30) Foreign Application Priority Data

Jul. 9, 2021 (KR) .......................... 10-2021-0090119

(51) Int. Cl.
| | |
|---|---|
| *F21V 8/00* | (2006.01) |
| *F21V 19/00* | (2006.01) |
| *F21K 9/61* | (2016.01) |
| *F21Y 115/10* | (2016.01) |
| *F21K 9/237* | (2016.01) |

(52) U.S. Cl.
CPC ................ *F21K 9/237* (2016.08); *F21K 9/61* (2016.08); *F21V 19/002* (2013.01); *F21V 19/0035* (2013.01); *G02B 6/0021* (2013.01); *G02B 6/0023* (2013.01); *G02B 6/0068* (2013.01); *F21Y 2115/10* (2016.08); *G02B 6/0073* (2013.01)

(58) Field of Classification Search
CPC .......... F21K 9/237; F21K 9/61; F21V 19/002; F21V 19/0035; G02B 6/0021; G02B 6/0023; G02B 6/0068; G02B 6/0073; F21Y 2115/10
See application file for complete search history.

(56) References Cited

U.S. PATENT DOCUMENTS

| | | | |
|---|---|---|---|
| 7,473,022 B2 * | 1/2009 | Yoo ...................... | G02B 6/0021 362/621 |
| 2004/0004827 A1 * | 1/2004 | Guest ................... | G02B 6/0091 362/249.06 |
| 2012/0057367 A1 * | 3/2012 | Park ................... | G02F 1/133603 362/606 |

FOREIGN PATENT DOCUMENTS

| | | | | |
|---|---|---|---|---|
| GB | 2479590 A | * | 10/2011 | ........... B21C 37/207 |
| JP | 2007123133 A | * | 5/2007 | |
| KR | 20-1987-0015317 U | | 10/1987 | |
| KR | 10-2013-0044136 A | | 5/2013 | |
| KR | 20130056389 A | * | 5/2013 | ........... G02B 6/0068 |
| KR | 10-2018-0003865 A | | 1/2018 | |
| KR | 10-2018-0073896 A | | 7/2018 | |
| KR | 10-2018-0095187 A | | 8/2018 | |

(Continued)

*Primary Examiner* — Alan B Cariaso
(74) *Attorney, Agent, or Firm* — Patent Office of Dr. Chung Park (57) ABSTRACT

Provided is a surface light emitting illumination device including: a light guide panel on which a fine pattern is formed; a channel that includes a pair of first and second channels inside an edge of the light guide panel, and a third channel that connects the first and second channels; first and second LED strips inserted in the first and second channels, in which a plurality of LED chips are mounted on a flexible substrate; an electric wire inserted in the third channel to connect the first and second LED strips; first and second fixing bands inserted in the first and second channels to fix the first and second LED so that the first and second LED strips are not separated from the first and second channels; and a channel communication part formed in a side wall of the light guide panel to communicate with the first channel.

3 Claims, 5 Drawing Sheets

(56) References Cited

FOREIGN PATENT DOCUMENTS

| WO | WO-2010035230 A1 | * | 4/2010 | ........... G02B 6/0021 |
| WO | WO-2019081476 A1 | * | 5/2019 | .............. F21V 15/01 |

* cited by examiner

US 11,480,304 B1

SURFACE LIGHT EMITTING ILLUMINATION DEVICE USING SEPARATE LED STRIPS

TECHNICAL FILED

The present invention relates to a surface light emitting illumination device, and more particularly, to a surface light emitting illumination device using separate LED strips capable of providing high-quality surface light emission using the separate LED strips.

BACKGROUND

The surface light emitting illumination device is a device for emitting light through a surface, which can be operated with low power and can be manufactured in various sizes, and has recently been used for information delivery such as promotion or product advertisement as well as illumination.

Such a surface light emitting illumination device includes a light guide panel having a fine pattern on its surface, a pair of LED strips on which a plurality of LED chips are mounted around the side surface of the light guide panel, and an edge frame having a "U" cross-sectional shape for fixing the LED strips to the side surface of the light guide panel, and is made by attaching an information sheet with information content printed thereon to the light guide panel.

In such a surface light emitting illumination device, light emitted from the pair of LED strips is introduced into the light guide panel, is reflected from its bottom, and is diffused through the pattern. As a result, the entire surface of the information sheet is irradiated with surface light to clearly display the printed information content. A related art is disclosed in Korean Patent Laid-open Publication No. 10-2018-0121634 under the title of "light guide panel and surface light emitting illumination device".

However, in such a surface light emitting illumination device, since the LED strip is fixed to the light guide panel by the edge frame, processes such as manufacturing an edge frame material and cutting it to a necessary length, and fixing the LED strip with the edge frame are complicated.

In addition, while the light guide panel has various sizes depending on illumination devices made in various sizes to order, the LED strip has a standardized size and a constant length. Accordingly, in a case where the length of one side of the light guide panel of the illumination device is larger than that of the standardized LED strip, shades may occur at both ends of the light guide panel, and these shades appear more prominent in a case where a white area exists in the information sheet, resulting in lowering the quality of surface light emission.

SUMMARY OF THE INVENTION

In order to solve the above mentioned problems, an object of the present invention is to provide a surface light emitting illumination device using separate LED strips capable of simplifying a manufacturing process without using an edge frame.

Another object of the present invention is to provide a surface light emitting illumination device using separate LED strips capable of performing high-quality surface light emission by removing a shaded area from a light guide panel.

According to an aspect of the present invention, there is provided a surface light emitting illumination device using separate LED strips including: a light guide panel 10 on which a fine pattern P is formed; a channel 20 that includes a pair of first and second channels 21 and 22 that face each other inside an edge of the light guide panel 10, and a third channel 23 that connects the first and second channels 21 and 22; first and second LED strips 30 and 30' that are inserted in the first and second channels 21 and 22, in which a plurality of LED chips 32 are mounted on a flexible substrate 31 at regular intervals; an electric wire 40 that is inserted in the third channel 23 and connects the first and second LED strips 30 and 30'; first and second fixing bands 50 and 50' that are inserted in the first and second channels 21 and 22 to fix the first and second LED strips 30 and 30' so that the first and second LED strips 30 and 30' are not separated from the first and second channels 21 and 22; and a channel communication part 60 that is formed in a side wall of the light guide panel 10 to communicate with the first channel 21.

In the surface light emitting illumination device, in a case where the plurality of LED chips that are mounted on the flexible substrate 31 of each of the first and second LED strips 30 and 30' are defined as a first chip 32a, a second chip 32b, a third chip 32c, . . . , an (n−2)-th chip 32n-2, an (n−1)-th chip, 32n-1 and an n-th chip 32n, the first chip 32a, the second chip 32b, the third chip 32c, . . . , the (n−2)-th chip 32n-2, and the (n−1)-th chip 32n-1 are positioned in the first and second channels 21 and 22, and the n-th chip 32n and thereafter are positioned in the third channel 23.

In the surface light emitting illumination device, a first light shielding layer 33 that shields light emission to the light guide panel 10 is formed on a surface of the n-th chip 32n positioned in the third channel 23, and a second light shielding layer 34 that prevents light passed through the n-th chip 32n from passing through the light guide panel 10 is formed on an inner surface of the third channel 23.

In the surface light emitting illumination device, the first and second fixing bands 50 and 50' are formed of a multiplicity of first and second elastic curved parts 51 and 51'.

In the surface light emitting illumination device, the surface light emitting illumination device using the separate LED strips may further include a female connector 70 that is inserted into the channel communication part 60 to supply electric power to the first LED strip 30, and a male connector 80 that is detachably connected to the female connector 70.

According to the present invention, since the first and second LED strips 30 and 30' are fixed in the first and second channel 21 and 22 using the first and second fixing bands 50 and 50', it is possible to simplify the manufacturing process without an edge frame.

In addition, since the total length of the first and second LED stripes 30 and 30' is set so that the LED chips are mounted along the first and second channels 21 and 22 and the third channel 23, it is possible to prevent the occurrence of a shaded area by preventing the difference between the intensity of light from the LED chip positioned at each end of the first and second channels 21 and 22 and an adjacent LED chip, and the intensity of light from other adjacent LED chips, and thus, it is possible to enhance the surface light emission quality of the light guide panel 10.

DETAILED DESCRIPTION OF THE EMBODIMENTS

Hereinafter, a surface light emitting illumination device using separate LED strips according to an embodiment of the present invention will be described in detail with reference to the accompanying drawings.

Hereinafter, a term "on" or "above" may include not only a direct contact state but also a non-contact state between adjacent objects. Terms such as a first, a second, and the like are used to represent various components, but the components should not be limited by the terms. These terms are used only for the purpose of distinguishing one component from another. A singular expression of a component includes a plurality of components unless the expression clearly represents a single component on its context. Further, in a case where a part "comprises", "includes", "has" or "is provided with" a certain component, it means that the part may further include other components, unless otherwise stated. Furthermore, terms such as "unit" and "module" mean a unit that performs at least one function or operation. In the drawings, the size of components may be exaggerated or reduced for convenience of description. For example, since the size and thickness of each component in the drawings are arbitrarily shown for convenience of description.

Figure 1:
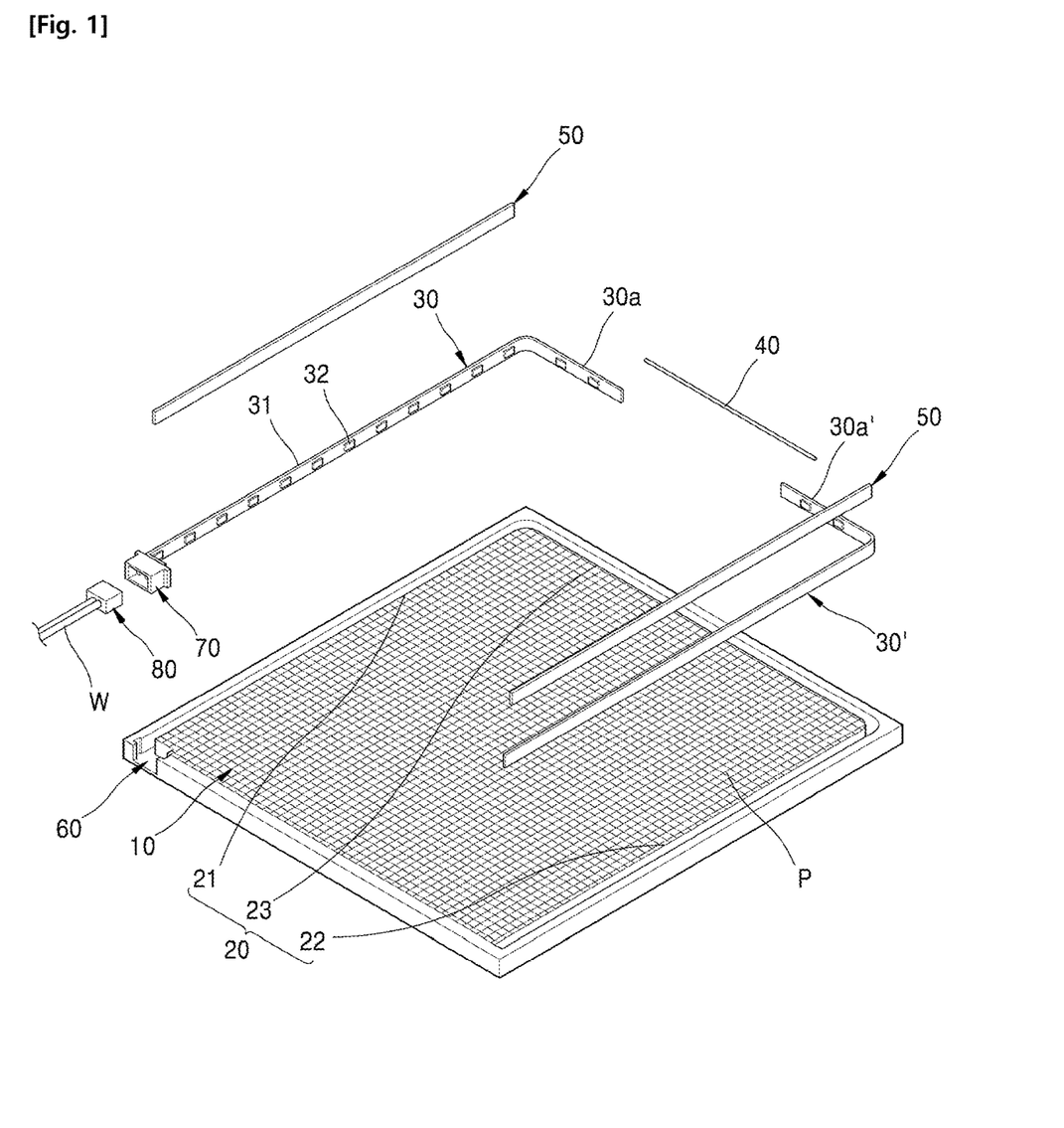
FIG. 1 is an exploded perspective view of a surface light emitting illumination device using separate LED strips according to an embodiment of the present invention.
Figure 2:
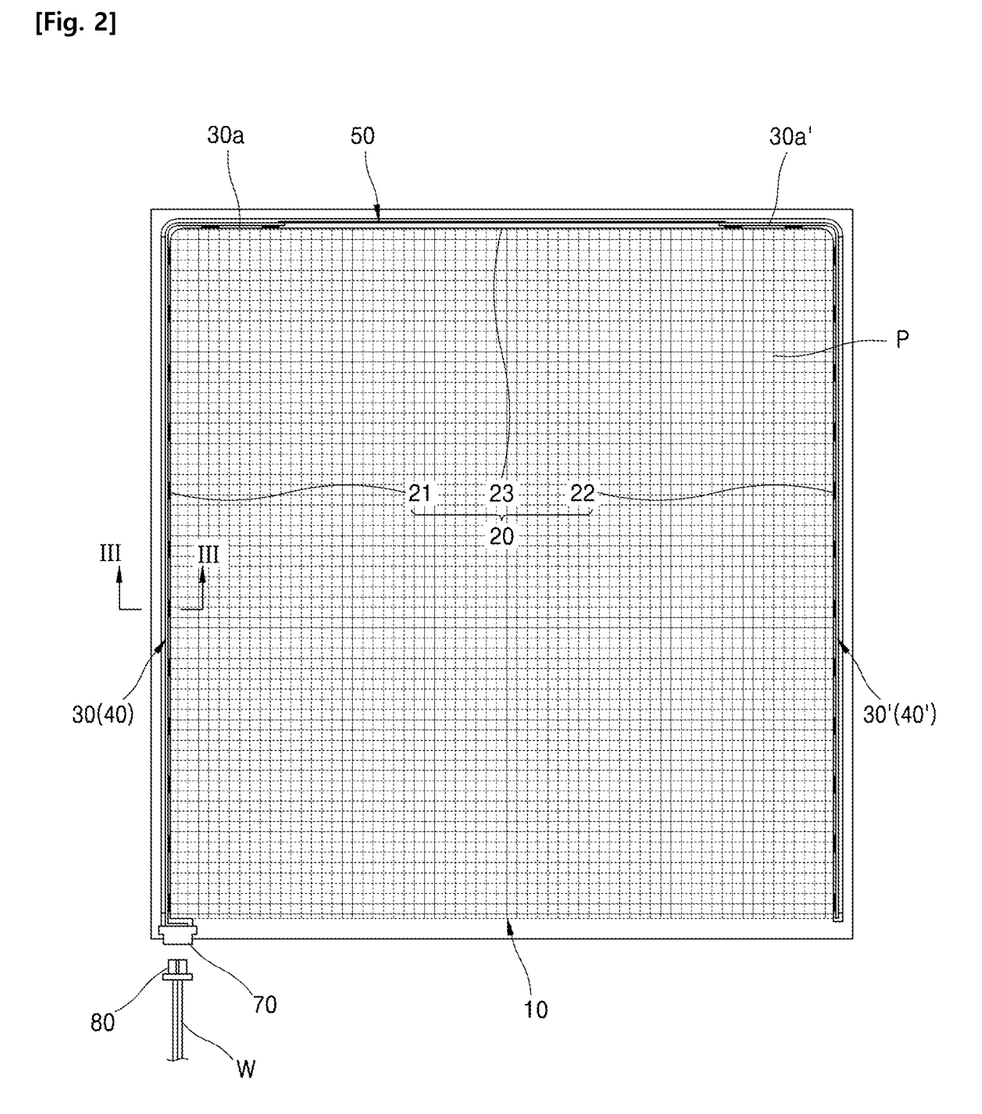
FIG. 2 is a plan view of the surface light emitting illumination device in FIG. 1.
Figure 3:
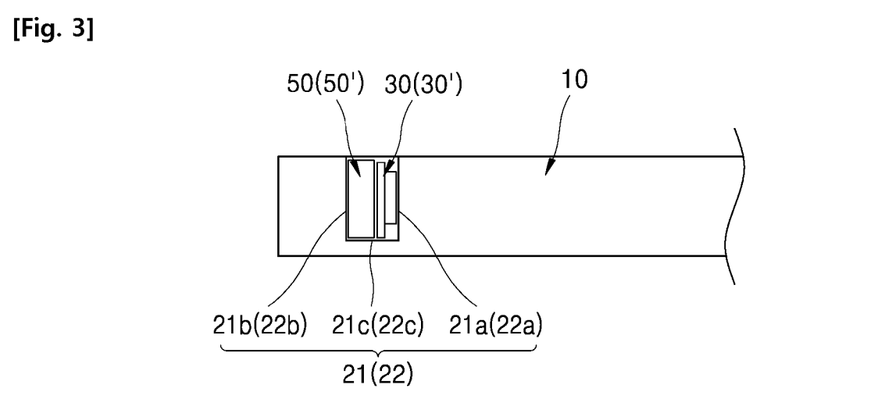
FIG. 3 is a schematic cross-sectional view taken along line of FIG. 2.
Figure 4:
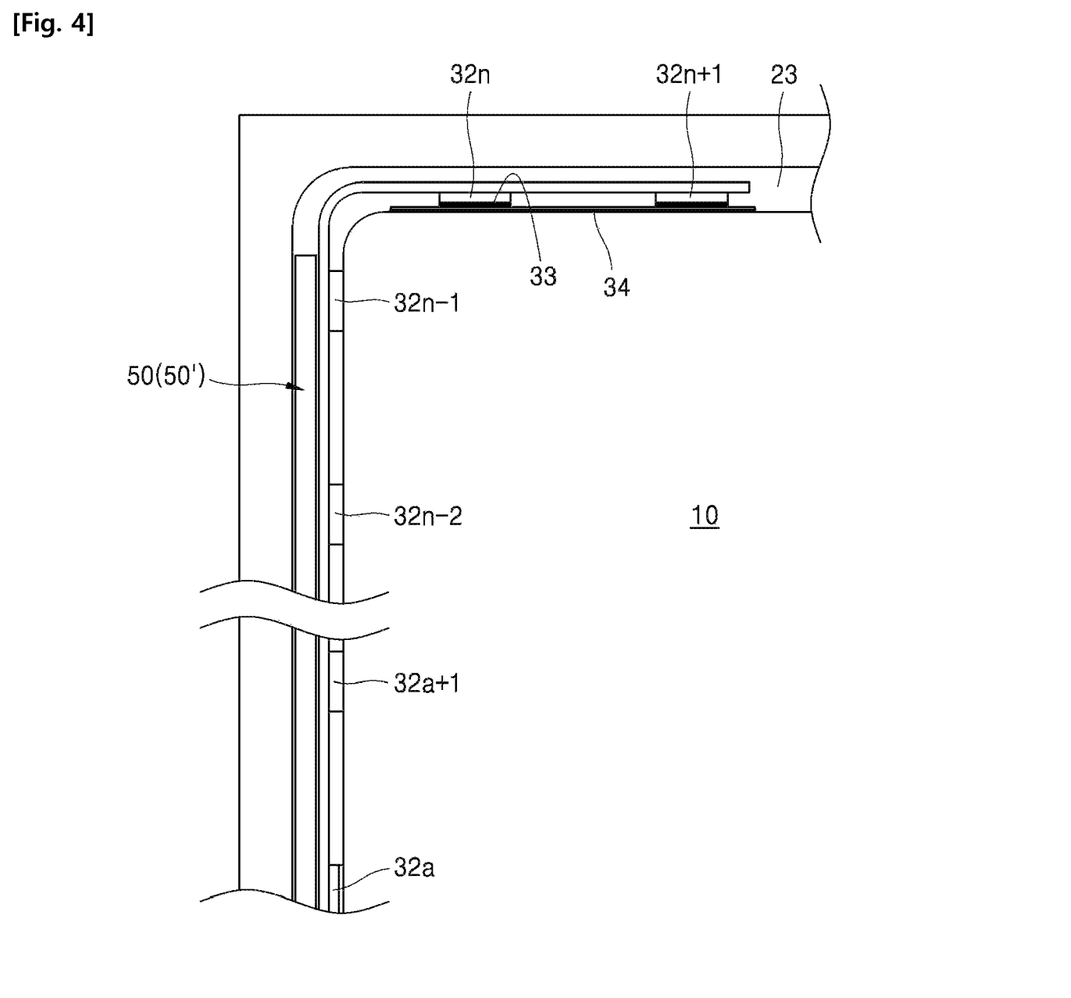
FIG. 4 is a view for illustrating a state where a first light shielding layer is formed on a surface of the LED chip positioned in a third channel in FIG. 2.
Figure 5:
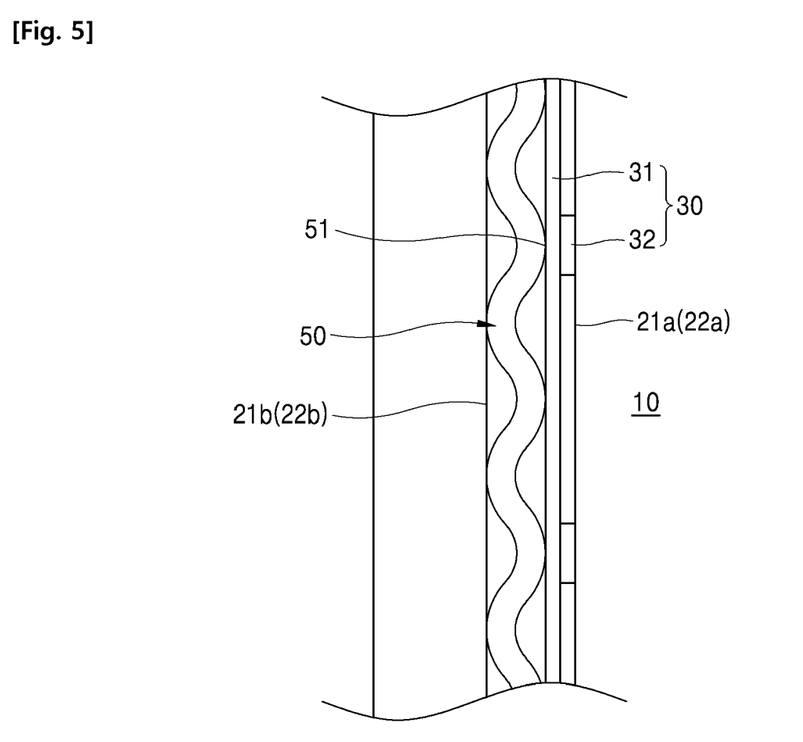
FIG. 5 is a view for schematically illustrating elastic curved parts formed on a fixing band in FIG. 2.
Figure 6:
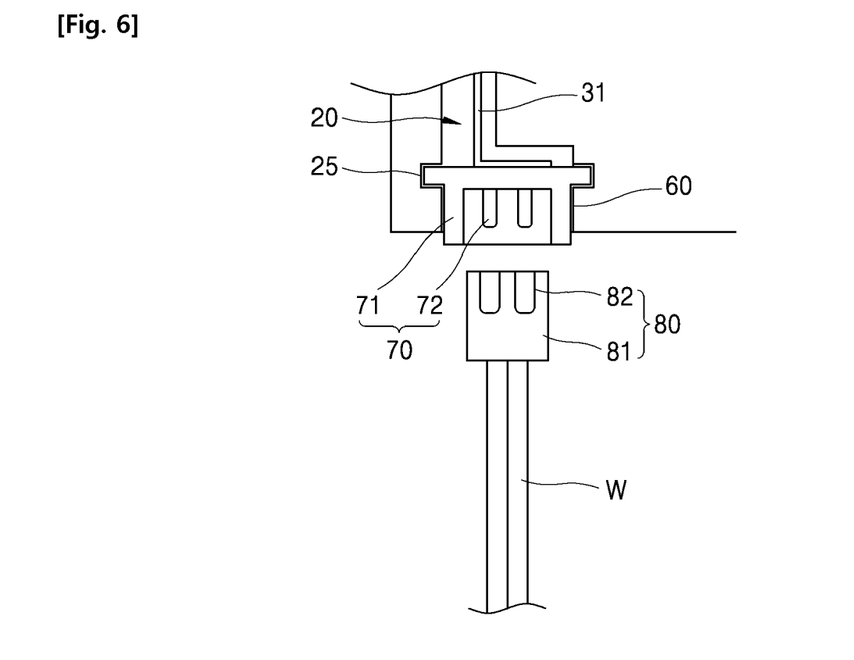
FIG. 6 is a diagram for schematically illustrating a female connector and a male connector in FIG. 2.

FIG. 1 is an exploded perspective view of a surface light emitting illumination device using separate LED strips according to an embodiment of the present invention, FIG. 2 is a plan view of the surface light emitting illumination device in FIG. 1, and FIG. 3 is a schematic cross-sectional view taken along line of FIG. 2. In addition, FIG. 4 is a view for illustrating a state where a first light shielding layer is formed on a surface of the LED chip located in a third channel in FIG. 2, FIG. 5 is a view for illustrating elastic curved parts formed on a fixing band in FIG. 2, and FIG. 6 is a diagram for schematically illustrating a female connector and a male connector in FIG. 2.

As shown in the figures, a surface light emitting illumination device using separate LED strips according to an embodiment of the present invention includes: a light guide panel 10 on which a fine pattern P is formed; a channel 20 that includes a pair of first and second channels 21 and 22 that face each other inside an edge of the light guide panel 10, and a third channel 23 that connects the first and second channels 21 and 22; first and second LED strips 30 and 30' that are inserted in the first and second channels 21 and 22, in which a plurality of LED chips 32 are mounted on a flexible substrate 31 at regular intervals; an electric wire 40 that is inserted in the third channel 23 and connects the first and second LED strips 30 and 30'; first and second fixing bands 50 and 50' that are inserted in the first and second channels 21 and 22 to fix the first and second LED strips 30 and 30' so that the first and second LED strips 30 and 30' are not separated from the first and second channels 21 and 22; a channel communication part 60 that is formed in a side wall of the light guide panel 10 to communicate with the first channel 21; a female connector 70 that is inserted into the channel communication part 60 to supply electric power to the first LED strip 30; and a male connector 80 that is detachably connected to the female connector 70.

The light guide panel 10 is made of a resin material such as an acrylic resin having a high transmitting property, on the surface of which the fine pattern P is formed to disperse light in horizontal and vertical directions. The light guide panel 10 may have various shapes, and in this embodiment, a square shape is shown as an example.

The channel 20 includes the pair of first and second channels 21 and 22 that face each other inside the edge of the light guide panel 10, and the third channel 23 that connects the first and second channels 21 and 22, and forms a space in which the first and second LED strips 30 and 30', and the first and second fixing bands 50 and 50' are accommodated.

As shown in FIG. 2, the first and second channels 21 and 22 form a space in which the first and second LED strips 30 and 30', and the first and second fixing bands 50 and 50' are accommodated.

The third channel 23 forms a space in which first and second extended LED strips 30a and 30a' extending from the first and second LED strips 30 and 30', and the electric wire 40 are accommodated.

The first and second channels 21 and 22 respectively have first and second channel inner surfaces 21a and 22a, first and second channel outer surfaces 21b and 22b that are spaced apart from the first and second channel inner surfaces 21a and 22a, and first and second channel bottom surfaces 21c and 22c that connect lower ends of the first and second channel inner surfaces 21a and 22a, and the first and second channel outer surfaces 21b and 22b. Further, the third channel 23 has a third channel inner surface, a third channel outer surface, and a third channel bottom surface, in a similar way to the first and second channels 21 and 22.

The electric wire 40 is inserted in the third channel 23, and electrically connects the first and second LED strips 30 and 30'.

As shown in the figures, the first and second LED strips 30 and 30' have a configuration in which the plurality of LED chips 32 are mounted at regular intervals on the thin and flexible substrate 31. The first and second LED strips 30 and 30' are accommodated in the first and second channels 21 and 22 so that the plurality of LED chips 32 that emit light face the first and second channel inner surfaces 21a and 22a.

The lengths of the first and second channels 21 and 22 may vary according to the size or shape of the light guide panel 10 and its position inside the edge of the light guide panel 10.

Further, the distance between the LED chips 32 on the first and second LED strips 30 and 30' may vary depending on their output. The price of an LED strip decreases as the distance between LED chips increases, and therefore, an LED strip in which the LED chips are arranged at an interval as large as possible is preferred for cost reduction.

Accordingly, the lengths of the first and second channels 21 and 22 may be greater than the lengths of the first and second LED strips 30 and 30' depending on the size of the light guide panel 10. In this case, there is a difference between the intensity of light from the LED chip positioned at each end of the first and second channels 21 and 22 and the LED chip that is adjacent thereto, and the intensity of light from other adjacent LED chips, which results in partial non-uniformity in the intensity of light introduced into the light guide panel 10 through the first and second channel inner surfaces 21a and 22a. This causes a partial shaded area in the light guide panel 10, which degrades the surface light emission quality.

In order to prevent such a problem, the total length of the first and second LED stripes 30 and 30' should be set so that the LED chips are mounted along the first and second channels 21 and 22, and the third channel 23.

More specifically, as shown in FIG. 4, in a case where the plurality of LED chips that are mounted on the flexible substrate 31 of each of the first and second LED strips 30 and 30' are defined as a first chip 32a, a second chip 32b, a third chip 32c, . . . , an (n–2)-th chip 32n-2, an (n–1)-th chip 32n-1, and an n-th chip 32n, the first chip 32a, the second chip 32b, the third chip 32c, . . . , the (n–2)-th chip 32n-2, and the (n–1)-th chip 32n-1 should be positioned in the first and second channels 21 and 22, and the n-th chip 32n and other subsequent chips should be positioned in the third channel 23. In this embodiment, an example in which the n-th chip 32n and the (n+1)-th chip 32n+1 are positioned in the third channel 23 is shown.

Here, a first light shielding layer 33 that shields light emission to the light guide panel 10 through the third channel 23 is formed on the surface of the n-th chip 32n positioned in the third channel 23. The first light shielding layer 33 may be implemented in various ways, and in this embodiment, it is made of a black paint.

Further, a second light shielding layer 34 that prevents light partially passed through the n-th chip 32n from passing through the light guide panel 10 is formed on an inner surface of the third channel 23. The second light shielding layer 34 may be implemented in various ways, and in this embodiment, it is made of a black paint.

With this structure, it is possible to prevent the occurrence of a shaded area by preventing the difference between the intensity of light from the LED chip positioned at each end of the first and second channels 21 and 22 and an adjacent LED chip, and the intensity of light from other adjacent LED chips, and thus, it is possible to enhance the surface light emission quality of the light guide panel 10.

The electric wire 40 is inserted in the third channel 23 to electrically connect the first and second LED strips 30 and 30'. Accordingly, one LED strip may be connected to a power supply, and thus, it is possible to achieve a relatively clean finish.

The first and second fixing bands 50 and 50' are provided to fix the positions of the first and second LED strips 30 and 30' in the first and second channels 21 and 22 and to push the plurality of LED chips toward the first and second inner side surfaces 21a and 22a.

The first and second fixing bands 50 and 50' are made of a resin material that is cut from a long base material at an appropriate length, and have a length shorter than the entire length of the first and second channels 21 and 22 and a width slightly smaller than the depth of the first and second channels 21 and 22 in order to be inserted in the first and second channels 21 and 22. Accordingly, in a state where the first and second fixing bands 50 and 50' are accommodated in the first and second channels 21 and 22, as shown in FIG. 3, the first and second fixing bands 50 and 50' are not exposed from the surface of the light guide panel 10.

On the other hand, the first and second fixing bands 50 and 50' are inserted into an empty space between the rear surface of the first and second LED strips 30 and 30' and the second channel outer surfaces 21b and 22b to push the plurality of LEDs 32 forming the first and second LED strips 30 and 30' toward the first and second channel inner surfaces 21a and 22a.

However, in a case where the first and second LED strips 30 and 30' are operated for a long period of time, the gap between the first and second channels 20 and 20' and the first and second channel inner surfaces 21a and 22a or the thickness of the first and second fixing bands 50 and 50' may be slightly changed due to heat generated from the LED chips 32. In this case, a specific LED chip among the plurality of LED chips 32 may be partially spaced apart from the first and second channel inner surfaces 21a and 22a, and in this case, the intensity of light introduced into the light guide panel 10 through the first and second channel inner surfaces 21a and 22a after being emitted from the plurality of LED chips 32 partially becomes non-uniform. In this case, the brightness of the light emitted from the surface of the light guide panel 10 does not become uniform, and thus, the surface emission quality is lowered.

In order to prevent such a problem, the first and second fixing bands 50 and 50' are provided to include a multiplicity of elastic curved first and second parts 51 and 51', as shown in FIG. 5. With this configuration, in a case where the first and second fixing bands 50 and 50' are inserted between the first and second LED strips 30 and 30' and the first and second channel outer surfaces 21b and 22b, the first and second elastic curved parts 51 press the first and second LED strips 30 and 30' toward the first and second channel inner surfaces 21a and 22a, and accordingly, even in the case of a long-time use, it is possible to prevent the LED chips 32 from being partially spaced apart from the first and second channel inner surfaces 21a and 22a, and thus, it is possible to maintain a uniform brightness at all times, thereby realizing high-quality surface light emission.

The channel communication part 60 provides a space in which the female connector 70 for supplying electric power to the first and second LED strips 30 and 30' is mounted.

The female connector 70 includes a female connector body 71 that is directly connected to the flexible substrate 31 at one end of the first LED strip 30, and a first terminal 72 that is provided inside the female connector body 71 and is electrically connected to the first LED strip 30.

Since the female connector 70 is connected to the first LED strip 30 to form a single body, it is possible to perform assembly with the light guide panel 10 by a simple operation of inserting the female connector 70 into the channel communication part 60 in a state where the first LED strip 30 is inserted in the first channel 20.

The male connector 80 is connected to a power supply line W, and includes a male connector body 81 that is inserted into the female connector body 71, and a second terminal 82 that is mounted on the male connector body 81 and is detachably connected to the first terminal 72.

In the surface light emitting illumination device of the present invention, since the male connector 80 can be separated from the female connector 70, it is possible to enable mass production of the light guide panels 10, in which the female connector 70 is combined in a single body, for stack-storage.

On the other hand, the female connector 70 should not be separated to the outside of the light guide panel 10 while being inserted into the channel communication part 60. To this end, as shown in FIG. 6, a pair of channel steps 25 is formed in a region of the first channel inner surface 21a and the first channel outer surface 21b connected to the channel communication part 60, and stepped protrusions 75 to be supported on the pair of channel steps 25 are formed on both sides of the female connector 70. With this configuration, in a case where the female connector 70 is inserted into the channel communication part 60 so that the stepped protrusions 75 are locked on the channel steps 25, it is possible to fix the position of the female connector 70 without use of an adhesive or the like.

As described above, according to the present invention, since the first and second LED strips 30 and 30' are fixed in the first and second channels 21 and 22 using the first and second fixing bands 50 and 50', it is possible to simplify the manufacturing process compared with a conventional edge frame.

In addition, since the total length of the first and second LED stripes 30 and 30' is set so that the LED chips are mounted along the first and second channels 21 and 22, and the third channel 23, it is possible to prevent the occurrence of a shaded area by preventing the difference between the intensity of light from the LED chip positioned at each end of the first and second channels 21 and 22 and an adjacent LED chip, and the intensity of light from other adjacent LED chips, and thus, it is possible to enhance the surface light emission quality of the light guide panel 10.

Although the present invention has been described above with reference to the embodiment shown in the drawings, it will be understood by those skilled in the art that various modifications and equivalents may be made in a range without departing from the concept of the invention.

What is claimed is:

1. A surface light emitting illumination device using separate LED strips comprising:
    a light guide panel on which a fine pattern P is formed;
    a channel that includes a pair of first and second channels that face each other inside an edge of the light guide panel, and a third channel that connects the first and second channels;
    first and second LED strips that are inserted in the first and second channels, in which a plurality of LED chips are mounted on a flexible substrate at regular intervals;
    an electric wire that is inserted in the third channel and connects the first and second LED strips;
    first and second fixing bands that are inserted in the first and second channels to fix the first and second LED strips so that the first and second LED strips are not separated from the first and second channels; and
    a channel communication part that is formed in a side wall of the light guide panel to communicate with the first channel,
    wherein in a case where the plurality of LED chips that are mounted on the flexible substrate of each of the first and second LED strips are defined as a first chip, a second chip, a third chip, . . . , an (n−2)-th chip, an (n−1)-th chip, and an n-th chip, the first chip, the second chip, the third chip, . . . , the (n−2)-th chip, and the (n−1)-th chip are positioned in the first and second channels, and the n-th chip and another subsequent chip are positioned in the third channel,
    a first light shielding layer that shields light emission to the light guide panel is formed on a surface of the n-th chip positioned in the third channel, and
    a second light shielding layer that prevents light partially passed through the n-th chip from passing through the light guide panel is formed on a rear surface of the third channel.

2. The surface light emitting illumination device according to claim 1,
    wherein the first and second fixing bands are formed of a multiplicity of elastic curved parts.

3. The surface light emitting illumination device according to claim 1, further comprising:
    a female connector that is inserted into the channel communication part to supply electric power to the first LED strip; and
    a male connector that is detachably connected to the female connector.

* * * * *